(12) United States Patent
Miyazaki et al.

(10) Patent No.: US 7,448,001 B2
(45) Date of Patent: Nov. 4, 2008

(54) IMAGE FILE MANAGEMENT APPARATUS AND METHOD, PROGRAM, AND STORAGE MEDIUM

(75) Inventors: Shigeyuki Miyazaki, Yokohama (JP); Yoshinobu Kitamaru, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 11/210,778

(22) Filed: Aug. 25, 2005

(65) Prior Publication Data
US 2006/0044416 A1   Mar. 2, 2006

(30) Foreign Application Priority Data
Aug. 31, 2004 (JP) ............... 2004-252895

(51) Int. Cl.
*G06F 3/00* (2006.01)
*G06F 3/14* (2006.01)
(52) U.S. Cl. .............. 715/853; 715/765; 715/810; 715/854; 715/205; 707/200; 707/1; 348/231.2
(58) Field of Classification Search ........... 715/719, 715/764, 822, 823, 835, 838, 853, 854; 707/1, 707/104.1, 200, 205
See application file for complete search history.

(56) References Cited

U.S. PATENT DOCUMENTS

| | | | |
|---|---|---|---|
| 5,706,457 A * | 1/1998 | Dwyer et al. ............. 715/835 |
| 6,202,061 B1 * | 3/2001 | Khosla et al. ............. 707/3 |
| 6,415,298 B1 | 7/2002 | Oesterer et al. ........... 707/203 |
| 6,421,072 B1 * | 7/2002 | Ku et al. .................. 715/804 |
| 6,750,888 B1 * | 6/2004 | Nakagawa ................. 715/800 |
| 6,789,095 B2 | 9/2004 | Okuda et al. .............. 707/200 |
| 6,990,637 B2 * | 1/2006 | Anthony et al. ........... 715/851 |
| 7,197,493 B2 * | 3/2007 | Ashby et al. .............. 707/3 |
| 7,234,114 B2 * | 6/2007 | Kurtz et al. ............... 715/746 |
| 2002/0054158 A1 * | 5/2002 | Asami ..................... 345/838 |
| 2002/0140843 A1 | 10/2002 | Tretter et al. ............. 348/362 |
| 2003/0184653 A1 | 10/2003 | Ohkubo .................. 348/207.1 |
| 2004/0078389 A1 * | 4/2004 | Hamilton ................ 707/104.1 |
| 2004/0135904 A1 | 7/2004 | Shiota et al. ........... 348/231.99 |
| 2005/0149872 A1 * | 7/2005 | Fong et al. ................ 715/727 |
| 2005/0192924 A1 * | 9/2005 | Drucker et al. ............ 707/1 |

FOREIGN PATENT DOCUMENTS

| | | |
|---|---|---|
| JP | 05-165935 | 7/1993 |
| KR | 2002-0075728 | 10/2002 |
| KR | 2004-0020736 | 3/2004 |
| KR | 2004-0069074 | 8/2004 |
| WO | 2004/068369 | 12/2004 |

* cited by examiner

*Primary Examiner*—X. L Bautista
(74) *Attorney, Agent, or Firm*—Fitzpatrick, Cella, Harper & Scinto

(57) ABSTRACT

An object of this invention is to easily identify an image file transferred from an image input apparatus and saved in an image file management apparatus. In an image file management method of saving an image file transferred from an image input apparatus in a folder created in accordance with the photographing date information of the image file, when transferred image files include one kind of photographing date, one kind of folder to save the image files is displayed on a screen as a current folder. When a plurality of kinds of photographing dates are present, a folder of an upper hierarchy which includes a plurality of folders created in correspondence with the plurality of kinds of photographing dates is displayed on the screen as the current folder.

14 Claims, 9 Drawing Sheets

FIG. 9

| | SAVING DESTINATION FILE NAME | CURRENT FOLDER PATH |
|---|---|---|
| 1. | My Pictures¥2004¥05¥2004_05_20¥IMG_0001.JPG | My Pictures¥2004¥05¥2004_05_20 |
| | | ↓ |
| 2. | My Pictures¥2004¥05¥2004_05_20¥IMG_0002.JPG | My Pictures¥2004¥05¥2004_05_20 |
| | | ↓ |
| 3. | My Pictures¥2004¥05¥2004_05_28¥IMG_0003.JPG | My Pictures¥2004¥05 |
| | | ↓ |
| 4. | My Pictures¥2004¥07¥2004_07_26¥IMG_0004.JPG | My Pictures¥2004 |
| | | ↓ |
| 5. | My Pictures¥2003¥07¥2003_07_26¥IMG_0005.JPG | My Pictures |

IMAGE FILE MANAGEMENT APPARATUS AND METHOD, PROGRAM, AND STORAGE MEDIUM

FIELD OF THE INVENTION

The present invention relates to a technique of fetching an image file from an image input apparatus and managing it.

BACKGROUND OF THE INVENTION

Conventionally, when an image file is fetched from an image input apparatus into an image file management apparatus and saved, a folder (e.g., My Pictures) designated as a saving destination in advance is always displayed as a current folder. In this case, if a folder is to be automatically generated in accordance with the photographing date information (e.g., Jul. 26, 2004) of image data, a folder "My Pictures¥2004¥07¥2004_07_26" is automatically created, and an image file is saved in this folder. More specifically, a folder "2004" is created in a folder "My Pictures". A folder "07" is created in the folder "2004". In addition, a folder "2004_07_26" is created in the folder "07". This operation is automatically executed, and the image file is saved in the folder "2004_07_26". Since the folder "My Pictures" is designated as the current folder, all folders in "My Pictures" are displayed.

When image files transferred from the image input apparatus and held in the image file management apparatus are classified into a plurality of folders (for example, when a plurality of image files with different photographing dates are present), a folder which holds the latest transferred image file is displayed as the current folder.

In the former method of the prior arts, assume that a transferred image file is saved in a folder of a hierarchy deeper than the hierarchy including the folder (current folder) designated as the saving destination (in the above example, the hierarchy of the folder "2004" is present under the hierarchy of the folder "My Pictures" (current folder) designated as the saving destination. The hierarchy of the folder "07" is present under the hierarchy of the folder "2004". In addition, the hierarchy of the folder "2004_07_26" is present under the hierarchy of the folder "07"). In this case, the selected image file (currently fetched image file) is displayed small, as shown in FIG. 1. For this reason, it is difficult for the user to determine which image file has been fetched.

In the latter method of the prior arts, only one of the plurality of folders that hold images is displayed as the current folder. Hence, the user cannot determine which one of the remaining undisplayed folders holds the image file.

Non-patent reference 1 ("Save Photos in PC with Windows XP", [online], Feb. 21, 2003, Microsoft, [searched on Aug. 31, 2004], Internet <URL: http://www.microsoft.com/japan/windowsxp/digitalphotogr aphy/videos/getphotos.asp>) discloses opening a folder in which an image is fetched and selecting only a fetched image. However, the image fetch destination cannot be selected in accordance with a "given condition (e.g., photographing date)".

SUMMARY OF THE INVENTION

The present invention has been made in consideration of the above-described problems, and has as its object to easily identify an image file transferred from an image input apparatus and saved in an image file management apparatus.

In order to solve the above-described problems and achieve the object, according to the first aspect of the present invention, there is provided an image file management apparatus for saving an image file in a folder in accordance with information of the image file, wherein when one kind of image files are present, one kind of folder to save the image files is displayed on a screen as a current folder, and when a plurality of kinds of image files are present, a folder of an upper hierarchy which includes a plurality of folders corresponding to the plurality of kinds is displayed on the screen as the current folder.

According to the second aspect of the present invention, there is provided an image file management method of saving an image file in a folder in accordance with information of the image file, wherein when one kind of image files are present, one kind of folder to save the image files is displayed on a screen as a current folder, and when a plurality of kinds of image files are present, a folder of an upper hierarchy which includes a plurality of folders corresponding to the plurality of kinds is displayed on the screen as the current folder.

According to the third aspect of the present invention, there is provided a program causing a computer to execute the above image file management method.

According to the fourth aspect of the present invention, there is provided a computer-readable storage medium storing the above program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a view showing an example of how to change the current folder by using the algorithm shown in FIG. 8.

DETAILED DESCRIPTION OF THE PREFERRED EMBODIMENT

A preferred embodiment of the present invention will be described below in detail with reference to the accompanying drawings.

In this embodiment, an image file to be transferred from an image input apparatus and held in an image file management system is held in a "photographing year¥photographing month¥photographing day" folder which is automatically created in accordance with photographing information. In addition, as the saving destination folder, a "My Pictures" folder is designated.

[Display and Folder Tree When Image Files are Held in Single Folder]

Figure 1:
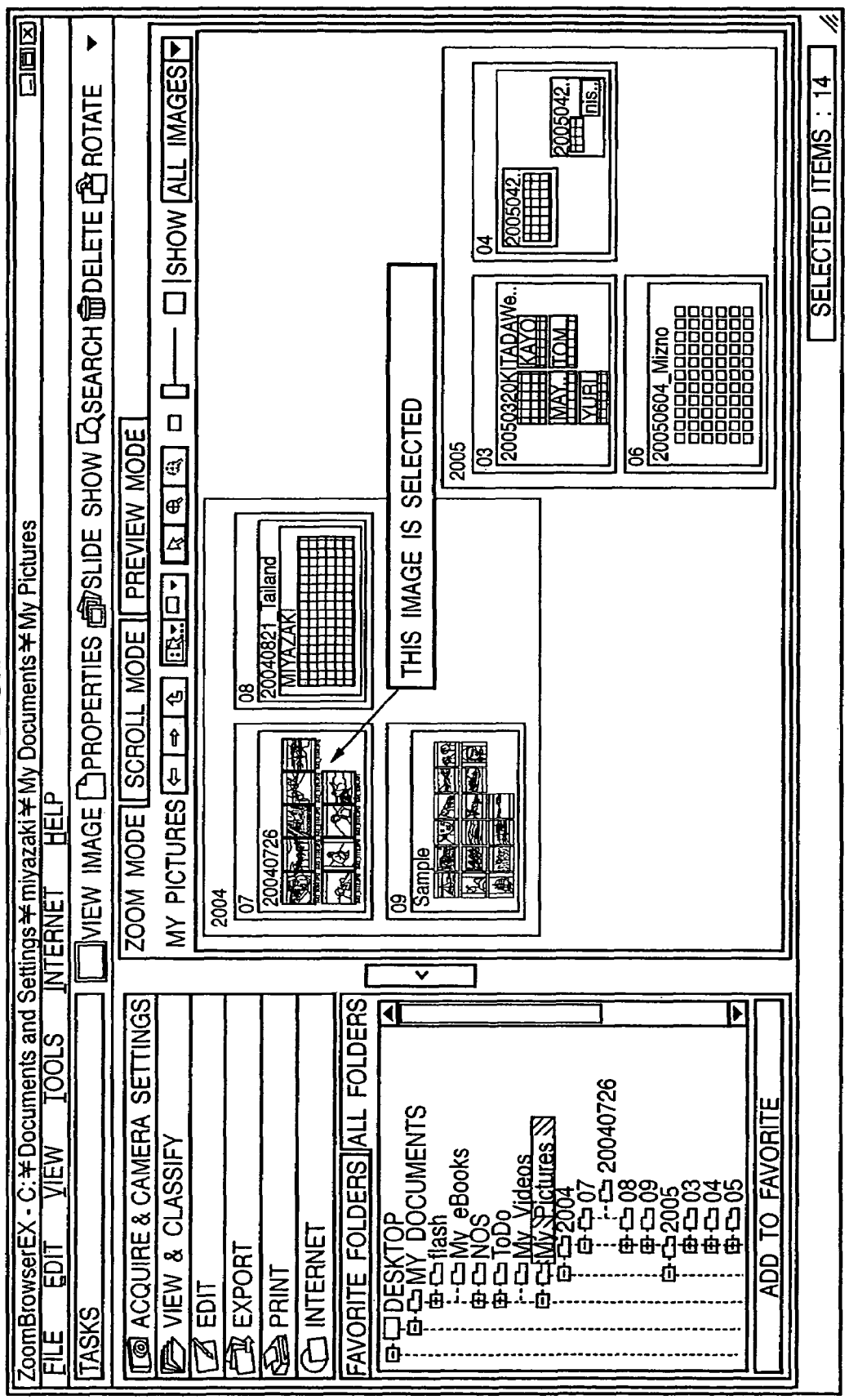
FIG. 1 is a view showing a window display example when an image is fetched in a deep hierarchy.
Figure 2:
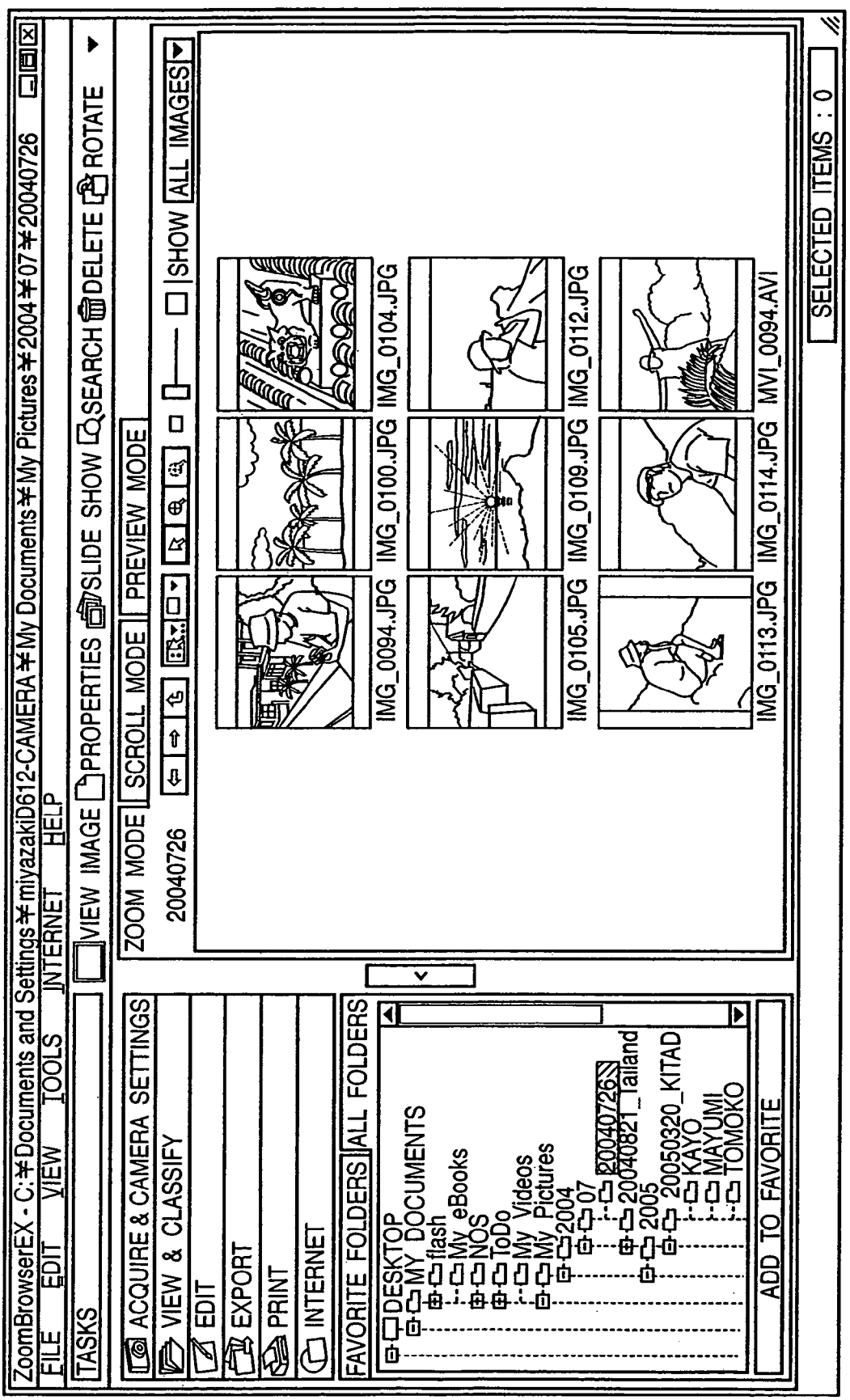
FIG. 2 is a view showing a window display example when all image files to be transferred and held are held in a single folder.
Figure 3:
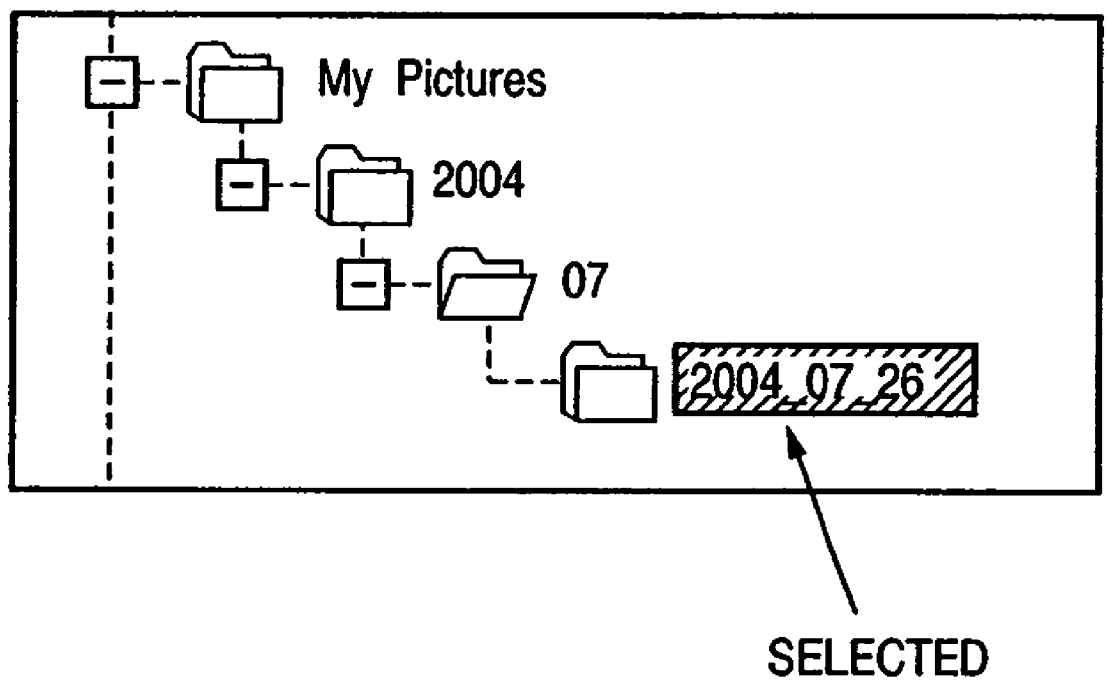
FIG. 3 is a view showing an example of a folder tree when all image files are held in a single folder.

When all image files to be transferred and held are held in a single folder, the single folder is displayed as a current folder, as shown in FIG. 2. FIG. 3 shows a folder tree in this case. Referring to FIG. 3, the selected folder is the current folder.

When image files obtained on, e.g., Jul. 26, 2004 are transferred under a condition that image files are transferred to a "photographing year¥photographing month¥photographing day" folder based on the "My Pictures" folder, the folder to hold the image files is "My Pictures¥2004¥07¥2004_07_26". The folder displayed as the current folder is also "My Pictures¥2004¥07¥2004_07_26".

[Display When Image Files are Held in Plurality of Folders]

(Display Example and Folder Tree When Images Sensed on Same Month of Same Year are Fetched)

Figure 4:
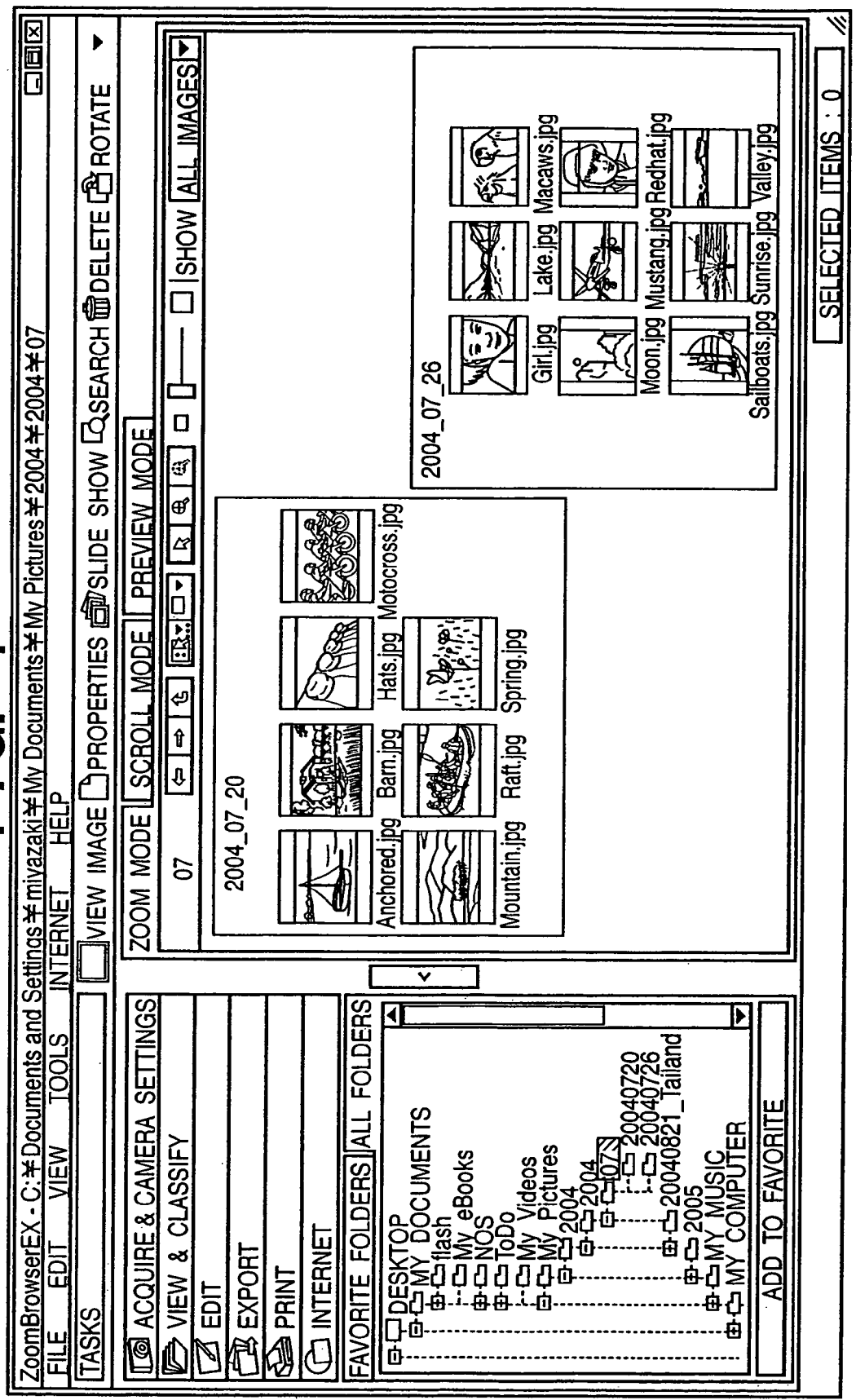
FIG. 4 is a view showing a window display example when a folder of an immediately upper hierarchy is used as a current folder.
Figure 5:
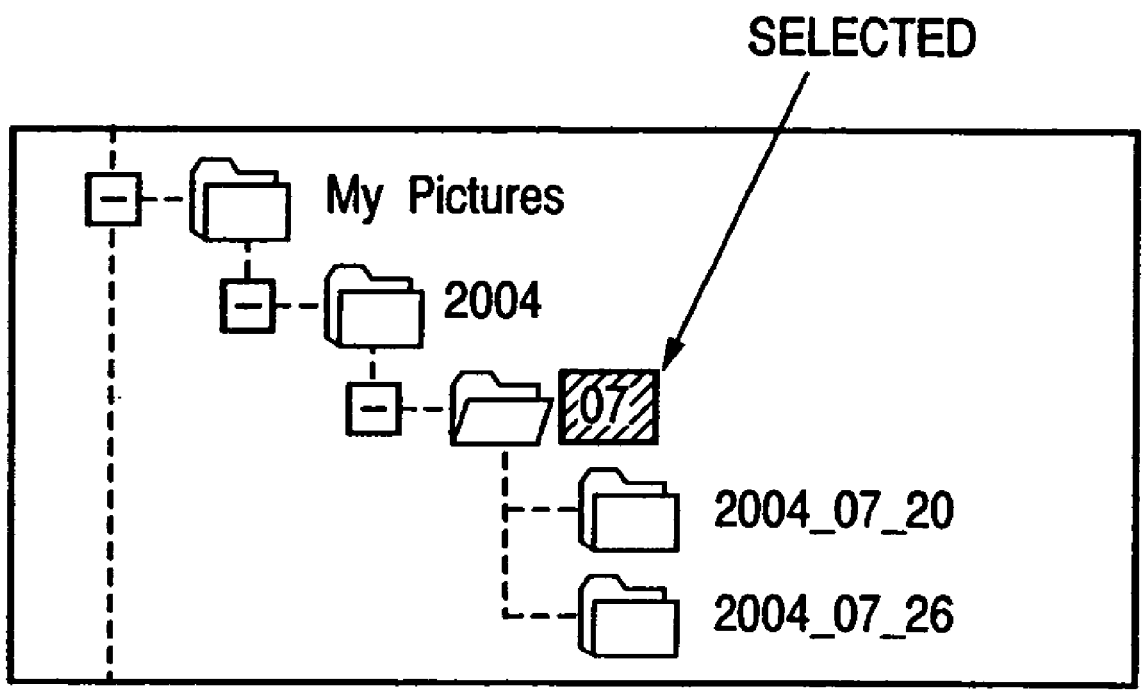
FIG. 5 is a view showing an example of a folder tree when a folder of an immediately upper hierarchy is used as a current folder.

When an image file group to be transferred and held include image files obtained on different days of the same month, a folder immediately above is displayed as the current folder, as shown in FIG. 4. FIG. 5 shows a folder tree in this case. Referring to FIG. 5, the selected folder is the current folder.

When an image file A obtained on, e.g., Jul. 20, 2004 and an image file B obtained on Jul. 26, 2004 are transferred under a condition that image files are transferred to a "photographing year¥photographing month¥photographing day" folder based on the "My Pictures" folder, the folder to hold the image file A is "My Pictures¥2004¥07¥2004_07 20", and the folder to hold the image file B is "My Pictures¥2004¥07¥2004_07_26". The folder displayed on the screen as the current folder is "My Pictures¥2004¥07" of the immediately upper hierarchy.

(Display Example and Folder Tree When Images Sensed in Same Year are Fetched Simultaneously)

Figure 6:
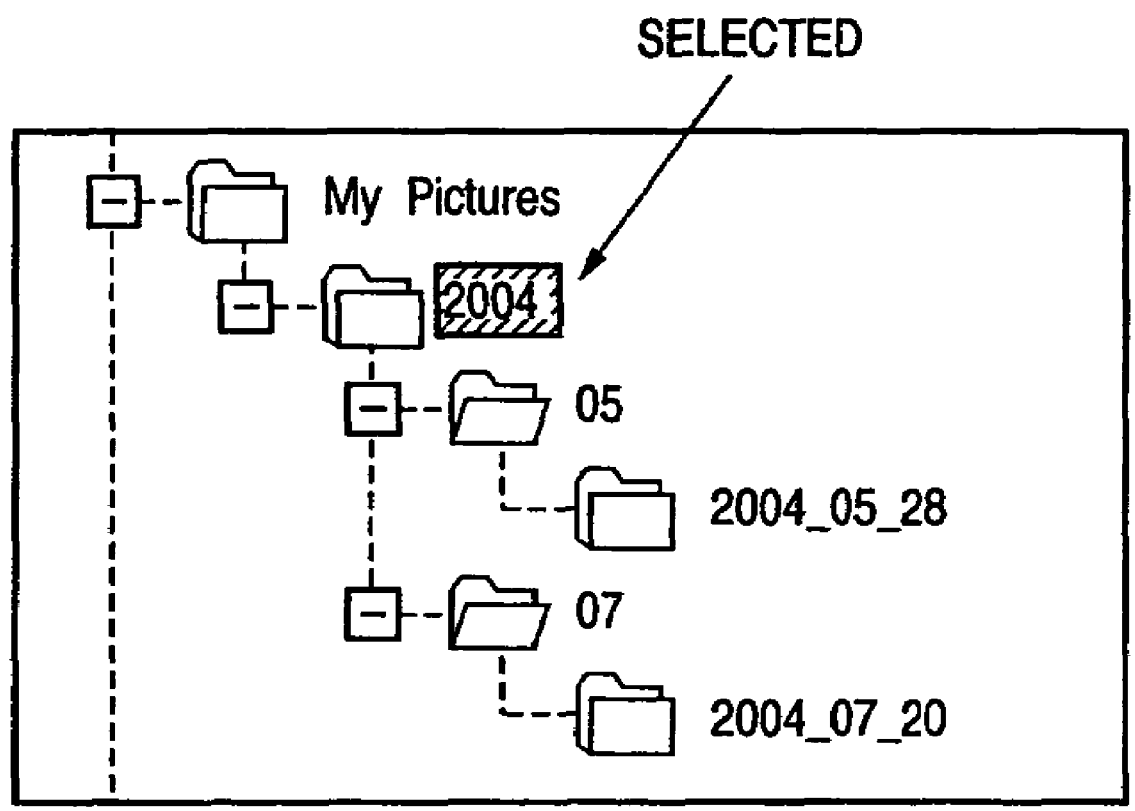
FIG. 6 is a view showing an example of a folder tree when a folder of a second upper hierarchy is used as a current folder.

When an image file group to be transferred and held include images sensed on different months of the same year, a folder of the second upper hierarchy is displayed as the current folder. FIG. 6 shows a folder tree in this case. Referring to FIG. 6, the selected folder is the current folder.

When the image file A obtained on, e.g., May 28, 2004 and the image file B obtained on Jul. 20, 2004 are transferred under a condition that image files are transferred to a "photographing year¥photographing month¥photographing day" folder based on the "My Pictures" folder, the folder to hold the image file A is "My Pictures¥2004¥05¥2004_05_28", and the folder to hold the image file B is "My Pictures¥2004¥07¥2004_07_20". The folder displayed on the screen as the current folder is "My Pictures¥2004" of the second upper hierarchy.

(Display Example and Folder Tree When Images Sensed in Different Years are Fetched Simultaneously)

Figure 7:
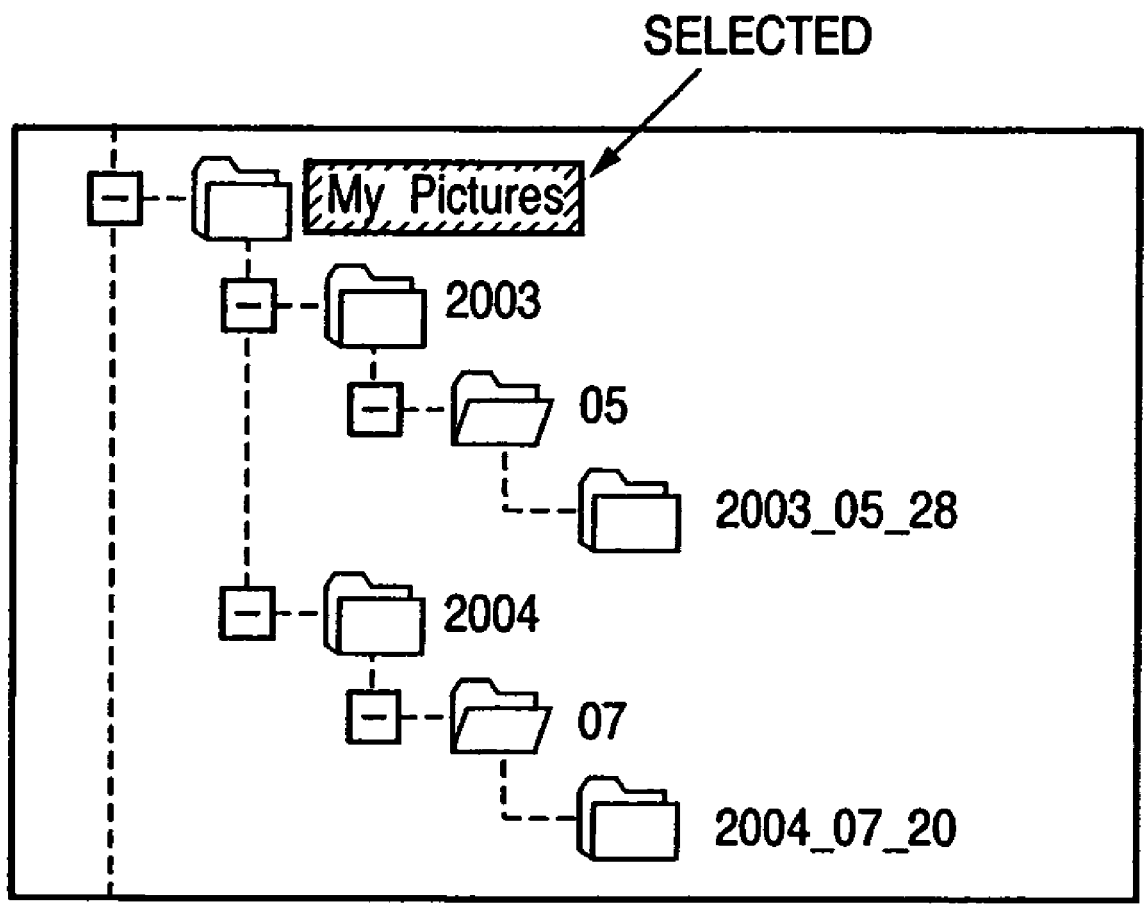
FIG. 7 is a view showing an example of a folder tree when a folder of a third upper hierarchy is used as a current folder.

When an image file group to be transferred and held include images sensed on different years, a folder of the third upper hierarchy is displayed as the current folder. FIG. 7 shows a folder tree in this case. Referring to FIG. 7, the selected folder is the current folder.

When the image file A obtained on, e.g., May 28, 2003 and the image file B obtained on Jul. 20, 2004 are transferred under a condition that image files are transferred to a "photographing year¥photographing month¥photographing day" folder based on the "My Pictures" folder, the folder to hold the image file A is "My Pictures¥2003¥05¥2003_05_28", and the folder to hold the image file B is "My Pictures¥2004¥07¥2004_07_20". The folder displayed on the screen as the current folder is "My Pictures" of the third upper hierarchy.

(Algorithm to Determine Current Folder)

An algorithm to determine the current folder will be described next with reference to FIG. 8.

When image file transfer starts in step S2, a saving destination folder path is acquired from the photographing date of the image file to be transferred and held (step S4).

In step S6, it is determined whether the transfer file is the first file. If it is the first image file, its saving destination folder path is set as the current folder path (step S13).

If it is determined in step S6 that the transfer file is not the first image file, the current set current folder path is compared with the saving destination folder path, and a portion where the paths match is extracted (step S10).

In step S12, the extracted path is set as the current folder path.

In step S14, it is determined whether transfer of all image files is ended. Steps S4 to S14 are repeated until transfer of all image files to be transferred and held is ended.

Figure 8:
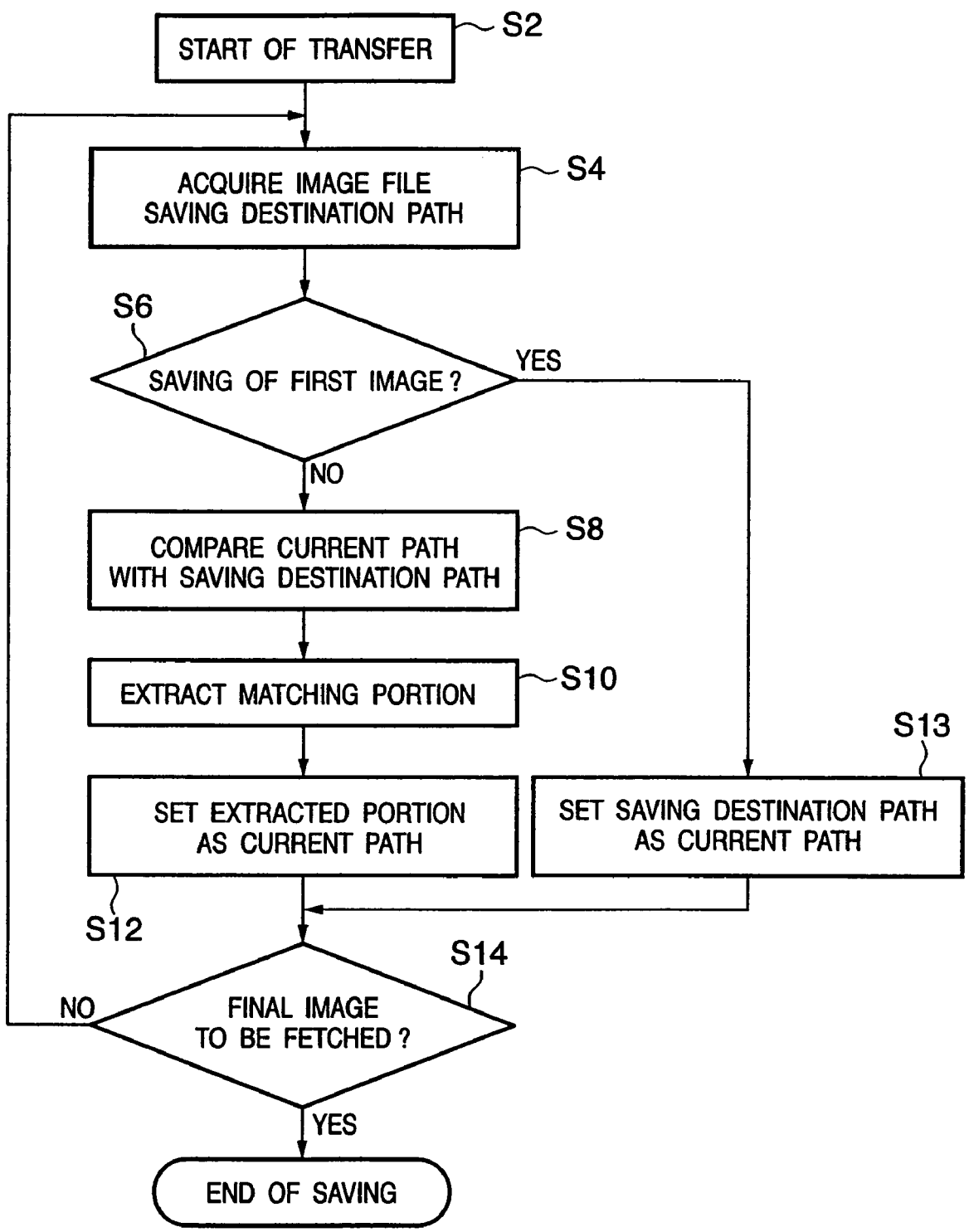
FIG. 8 is a flowchart showing an algorithm to determine a current folder.

FIG. 9 is a view showing an example of how to change the current folder by using the algorithm shown in FIG. 8.

The saving destination folder path of the first image file "My Pictures¥2004¥05¥2004_05_20¥IMG_0001.JPG" is "My Pictures¥2004¥05¥2004_05_20". For the first image file, the processing advances from step S6 to step S13 in FIG. 8. Hence, the saving destination folder path "My Pictures¥2004¥05¥2004_05_20" is directly used as the current folder path.

The saving destination folder path of the second image file "My Pictures¥2004¥05¥2004_05_20¥IMG_0002.JPG" is "My Pictures¥2004¥05¥2004_05_20", like the first image file. For the second image file, the current folder path is compared with the saving destination folder path in steps S8 and S10 in FIG. 8. In this case, the current folder path matches the saving destination folder path. Hence, the present current folder path "My Pictures¥2004¥05¥2004_05_20" is directly set as the current folder path (step S12 in FIG. 8).

The saving destination folder path of the third image file "My Pictures¥2004¥05¥2004_05_28¥IMG_0003.JPG" is "My Pictures¥2004¥05¥2004_05_28". This image file is obtained on a different day from but the same month as the second image file. For the third image file, the current folder path is compared with the saving destination folder path in steps S8 and S10 in FIG. 8. In this case, the portion where the current folder path "My Pictures¥2004¥05¥2004_05_20" matches the saving destination folder path "My Pictures¥2004¥05¥2004_05_28" is "My Pictures¥2004¥05". Hence, the current folder path is set to "My Pictures¥2004¥05". Both the contents of the folder "My Pictures¥2004¥05¥2004_05_20" and those of the folder "My Pictures¥2004¥05¥2004_05_28" are displayed on the screen (step S12 in FIG. 8).

The saving destination folder path of the fourth image file "My Pictures¥2004¥07¥2004_07_26¥IMG_0004.JPG" is "My Pictures¥2004¥07¥2004_07_26". This image file is obtained on a different month from but the same year as the third image file. For the fourth image file, the current folder path is compared with the saving destination folder path in steps S8 and S10 in FIG. 8. In this case, the portion where the current folder path "My Pictures¥2004¥05" matches the saving destination folder path "My Pictures¥2004¥07¥2004_

07_26" is "My Pictures¥2004". Hence, the current folder path is set to "My Pictures¥2004" (step S12 in FIG. 8).

The saving destination folder path of the fifth image file "My Pictures¥2003¥07¥2003_07_26¥IMG_0005.JPG" is "My Pictures¥2003¥07¥2003_07_26". This image file is obtained on a year different from that of the fourth image file. For the fifth image file, the current folder path is compared with the saving destination folder path in steps S8 and S10 in FIG. 8. In this case, the portion where the current folder path "My Pictures¥2004" matches the saving destination folder path "My Pictures¥2003¥07¥2003_07_26" is "My Pictures". Hence, the current folder path is set to "My Pictures" (step S12 in FIG. 8).

The current folder is set in the above-described way.

As described above, according to this embodiment, even when a transferred image file is held in a folder of a hierarchy deeper than the hierarchy including the folder designated as the saving destination, the held image is displayed large. Hence, it is easy for the user to determine the folder in which the image file is fetched.

All of the plurality of folders that hold images are displayed instantaneously as the transfer is ended. Hence, the user can easily discriminate the folder which holds the image files.

In the above embodiment, folders are hierarchically managed in accordance with photographing date information. However, the present invention is not limited to this and can also be applied to a system for hierarchically managing folders in accordance with another management information such as the camera model (e.g., maker name, single-lens reflex type or compact type, and model name).

As described above, according to the above embodiment, an image file transferred from an image input apparatus and saved in an image file management apparatus can easily be identified.

OTHER EMBODIMENT

The object of embodiment is achieved by supplying a storage medium (or recording medium) which stores software program codes for implementing the function of the above-described embodiment to a system or apparatus and causing the computer (or CPU or MPU) of the system or apparatus to read out and execute the program codes stored in the storage medium. In this case, the program codes read out from the storage medium implement the function of the above-described embodiment by themselves, and the storage medium which stores the program codes constitutes the present invention. The function of the above-described embodiment is implemented not only when the readout program codes are executed by the computer but also when the operating system (OS) running on the computer performs part or all of actual processing on the basis of the instructions of the program codes.

The function of the above-described embodiment is also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

When the present invention is applied to the storage medium, it stores program codes corresponding to the above-described procedures.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-252895 filed Aug. 31, 2004, which is hereby incorporated by reference herein.

What is claimed is:

1. An image file management apparatus for saving a plurality of image files in accordance with attribute information of the image files in response to a saving operation of the plurality of image files, comprising:
    a saving unit configured to save the plurality of image files in accordance with attribute information of the image files;
    a setting unit configured to automatically set a folder as a selected folder in accordance with a saving destination of the saved image files;
    a display control unit configured to control to distinguishably display the folder, which is set as the selected folder by said setting unit, on a screen,
    wherein in response to saving the plurality of image files in one folder, in accordance with attribute information of the image files, said setting unit sets the one folder as the selected folder, and in response to saving the plurality of image files in a plurality of folders, in accordance with attribute information of the image files, said setting unit sets a folder of an upper hierarchy which includes the plurality of folders as the selected folder.

2. The apparatus according to claim 1, wherein the attribute information of the image file is photographing date information.

3. The apparatus according to claim 1, wherein the image files are image files input from an image input apparatus.

4. The apparatus according to claim 3, wherein images input from the image input apparatus are displayed on the screen so as to discriminate the image from another image.

5. The apparatus according to claim 1, wherein all images saved in the image file management apparatus are displayed.

6. The apparatus according to claim 1, wherein the folder of the upper hierarchy which includes the plurality of folders is a folder common to hierarchies above the plurality of folders.

7. An image file management method of saving a plurality of image files in accordance with attribute information of the image files, in response to a saving operation of the plurality of image files, comprising:
    saving the plurality of image files in accordance with attribute information of the image files;
    automatically setting a folder as a selected folder in accordance with a saving destination of the saved image files;
    controlling to distinguishably display the folder, which is set as the selected folder, on a screen,
    wherein in response to saving the plurality of image files in one folder, in accordance with attribute information of the image files, the one folder is set as the selected folder, and in response to saving the plurality of image files in a plurality of folders, in accordance with attribute information of the image files, a folder of an upper hierarchy which includes the plurality of folders is set as the selected folder.

8. The method according to claim 7, wherein the attribute information of the image files is photographing date information.

9. The method according to claim 7, wherein the image files is an image files input from an image input apparatus.

10. The method according to claim 9, wherein images input from the image input apparatus is displayed on the screen so as to discriminate the image from another image.

11. The method according to claim 7, wherein all images saved in the image file management apparatus are displayed.

12. The method according to claim 7, wherein the folder of the upper hierarchy which includes the plurality of folders is a folder common to hierarchies above the plurality of folders.

13. A computer-executable program stored on a computer-readable storage medium, said computer-executable program being executable by a computer so as to control the computer to execute an image file management method of claim 7.

14. A computer-readable storage medium storing a computer-executable program of claim 13.

* * * * *